(12) United States Patent
Zhang et al.

(10) Patent No.: US 12,531,998 B2
(45) Date of Patent: Jan. 20, 2026

(54) INTERACTION BETWEEN BI-PREDICTION LOCAL ILLUMINATION COMPENSATION AND DECODER SIDE MOTION VECTOR REFINEMENT IN VIDEO CODING

(71) Applicant: QUALCOMM Incorporated, San Diego, CA (US)

(72) Inventors: Yan Zhang, San Diego, CA (US); Han Huang, San Diego, CA (US); Vadim Seregin, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/657,110

(22) Filed: May 7, 2024

(65) Prior Publication Data

US 2024/0388719 A1    Nov. 21, 2024

Related U.S. Application Data

(60) Provisional application No. 63/503,280, filed on May 19, 2023.

(51) Int. Cl.
*H04N 19/157* (2014.01)
*H04N 19/105* (2014.01)
*H04N 19/176* (2014.01)
*H04N 19/46* (2014.01)

(52) U.S. Cl.
CPC ......... *H04N 19/157* (2014.11); *H04N 19/105* (2014.11); *H04N 19/176* (2014.11); *H04N 19/46* (2014.11)

(58) Field of Classification Search
CPC .................... H04N 19/157; H04N 19/105
USPC ........................................ 375/240.02
See application file for complete search history.

(56) References Cited

U.S. PATENT DOCUMENTS

2024/0022729 A1    1/2024    Huang et al.
2024/0121426 A1    4/2024    Huang et al.

FOREIGN PATENT DOCUMENTS

WO    WO-2020233600 A1 *  11/2020    ........... H04N 19/105

OTHER PUBLICATIONS

Xiu (Kwai) X et al: "Non-EE2: Bi-predictive local illumination compensation", 28. JVET Meeting; Oct. 21, 2022-Oct. 28, 2022; Mainz ; (The Joint Video Exploration Team of ISO/IEC JTC1/SC29/WG11 and ITU-T SG. 16 ), No. JVET-AB0182 ; m60970 Oct. 22, 2022, XP030304782, Retrieved from the Internet: URL (Year: 2022).*

(Continued)

*Primary Examiner* — Amir Shahnami
(74) *Attorney, Agent, or Firm* — Shumaker & Sieffert, P. A.

(57) ABSTRACT

A video encoder and video decoder are configured to code a block of video data using a merge candidate list that includes one or more bi-predicted merge candidates, determine to apply only one of a decoder side motion vector refinement (DMVR) mode or a local illumination compensation (LIC) mode to the block of video data, and apply one of the DMVR mode or the LIC mode to the block of video data based on the determination.

18 Claims, 7 Drawing Sheets

(56) References Cited

OTHER PUBLICATIONS

Browne A., et al., "Algorithm Description for Versatile Video Coding and Test Model 19 (VTM 19)", 141. MPEG Meeting, Online, (Motion Picture Expert Group or ISO/IEC JTC1/SC29/WG11), No. m62432, JVET-AC2002, Jan. 16, 2023-Jan. 20, 2023, Apr. 7, 2023, 136 Pages, XP030308547, section 3.4.10.

Coban M., et al., "Algorithm Description of Enhanced Compression Model 8 (ECM 8)", 141. MPEG Meeting, Online, (Motion Picture Expert Group or ISO/IEC JTC1/SC29/WG11), No. m62440, JVET-AC2025, Jan. 16, 2023-Jan. 20, 2023, Apr. 6, 2023, 73 Pages, XP030308550, sections 3.2.1, 3.2.5.

International Search Report and Written Opinion—PCT/US2024/028360—ISA/EPO—Sep. 5, 2024.

Xiu X (Kwai Inc)., et al., "Non-EE2: Bi-Predictive Local Illumination Compensation", 28. JVET Meeting, Mainz, (The Joint Video Exploration Team of ISO/IEC JTC1/SC29/WG11 and ITU-T SG. 16), No. JVET-AB0182, m60970, Oct. 21, 2022-Oct. 28, 2022, Oct. 22, 2022, 3 Pages, XP030304782, the whole document.

Blestel M., et al., "EE2-2.1: On Affine DMVR", Joint Video Experts Team (JVET) of ITU-T SG 16 WP 3 and ISO/IEC JTC 1/SC 29, JVET-AD0182-v2, 30th Meeting, Antalya, TR, Apr. 21-28, 2023, pp. 1-10.

Chen J., et al., "Non-EE2: DMVR for Affine Merge Coded Blocks", JVET-AA0144, Jul. 18, 2022, 6 Pages.

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.

Seregin V., et al., "CE4-3.1a and CE4-3.1b: Unidirectional Local Illumination Compensation with Affine Prediction", JVET-O0066-v1, Joint Video Experts Team (JVET) of ITU-T SG 16 WP 3 and ISO/IEC JTC 1/SC 29/WG 11, 15th Meeting, Gothenburg, SE, Jul. 3-12, 2019, pp. 1-5.

Xiu X., et al., "EE2—Test2.7: Improvements on Local Illumination Compensation", JVET-AD0213-v1, Joint Video Experts Team (JVET) of ITU-T SG 16 WP 3 and ISO/IEC JTC 1/SC 29 30th Meeting, Antalya, TR, Apr. 21-28, 2023, pp. 1-4.

* cited by examiner

INTERACTION BETWEEN BI-PREDICTION LOCAL ILLUMINATION COMPENSATION AND DECODER SIDE MOTION VECTOR REFINEMENT IN VIDEO CODING

This application claims the benefit of U.S. Provisional Application No. 63/503,280, filed May 19, 2023, the entire content of which is incorporated by reference herein.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) that was developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for inter prediction in video codecs. More specifically, this disclosure describes methods related to the interaction between local illumination compensation and decoder side motion vector refinement. In particular, this disclosure describes techniques that may lower the complexity of video encoding and video decoding, by determining to perform either a decoder side motion vector refinement (DMVR) mode or bi-predicted local illumination compensation (LIC) mode mode for a block of video data.

In one example of the disclosure, a method includes coding a block of video data using a merge candidate list that includes one or more bi-predicted merge candidates, determining to apply only one of a DMVR mode or a LIC mode to the block of video data, applying one of the DMVR mode or the LIC mode to the block of video data based on the determination.

In another example, an apparatus includes a memory, and processing circuitry in communication with the memory, the processing circuitry configured to code a block of video data using a merge candidate list that includes one or more bi-predicted merge candidates, determine to apply only one of a DMVR mode or a LIC mode to the block of video data, and apply one of the DMVR mode or the LIC mode to the block of video data based on the determination.

In another example, this disclosure describes a non-transitory computer-readable storage medium storing instructions that, when executed, cause one or more processors of a device configured to code video data to code a block of video data using a merge candidate list that includes one or more bi-predicted merge candidates, determine to apply only one of a DMVR mode or a LIC mode to the block of video data, and apply one of the DMVR mode or the LIC mode to the block of video data based on the determination.

The details of one or more examples are set forth in the accompanying drawings and the description below. Other features, objects, and advantages will be apparent from the description, drawings, and claims.

DETAILED DESCRIPTION

A video encoder and video decode may be configured encode and decode blocks of video data using motion information from a merge candidate list. The merge candidate list may include one or more motion vectors, one or more reference picture lists, and reference picture directions from blocks neighboring or near the currently coded list. Merge candidates may include motion information from uni-predicted candidates and bi-predicted candidates. The video encoder and decoder may use such merge candidates in the context of both regular, translational motion prediction as well as affine motion predictions.

In some examples, video encoder 200 and video decoder 300 may be configured to apply additional coding tools when coding a block, such as decoder side motion derivation (DMVR) mode, affine DMVR mode, adaptive DMVR mode, adaptive affine DMVR mode, and/or local illumination compensation (LIC) mode. The merge candidates that are used as the input for DMVR mode, adaptive DMVR mode, affine DMVR mode, and adaptive affine DMVR mode may be bi-predicted candidates. With the extension of LIC mode to bi-predicted CUs, if a bi-predicated merge candidate satisfies the conditions for apply DMVR mode and has an inherited LIC flag equal to true (indicating LIC is to be applied), the video encoder and video decoder may be configured to apply both DMVR mode and bi-prediction LIC mode to a block of video data.

For DMVR mode, the video encoder and video decoder may be configured to perform multiple search stages with an integer pel search followed by a half-pel search and a trailing parametric error surface based sub-pixel offsets estimation. For bi-prediction LIC mode, the video encoder and video decoder may be configured to perform up to three iterations of LIC parameter estimation. The video encoder and video decoder may be configured to iteratively update the LIC parameters for reference picture list 0 and reference picture list 1 in an alternating manner.

Both DMVR mode and bi-predicted LIC mode are complicated with multiple search rounds or iterations. This complexity not only occurs at the video encoder, but also at the video decoder, which is not desirable for all use cases. To address this issue, and lower the complexity of video encoding and video decoding, this disclosure describes the techniques for determining to perform either DMVR mode or bi-predicted LIC mode.

Figure 1:
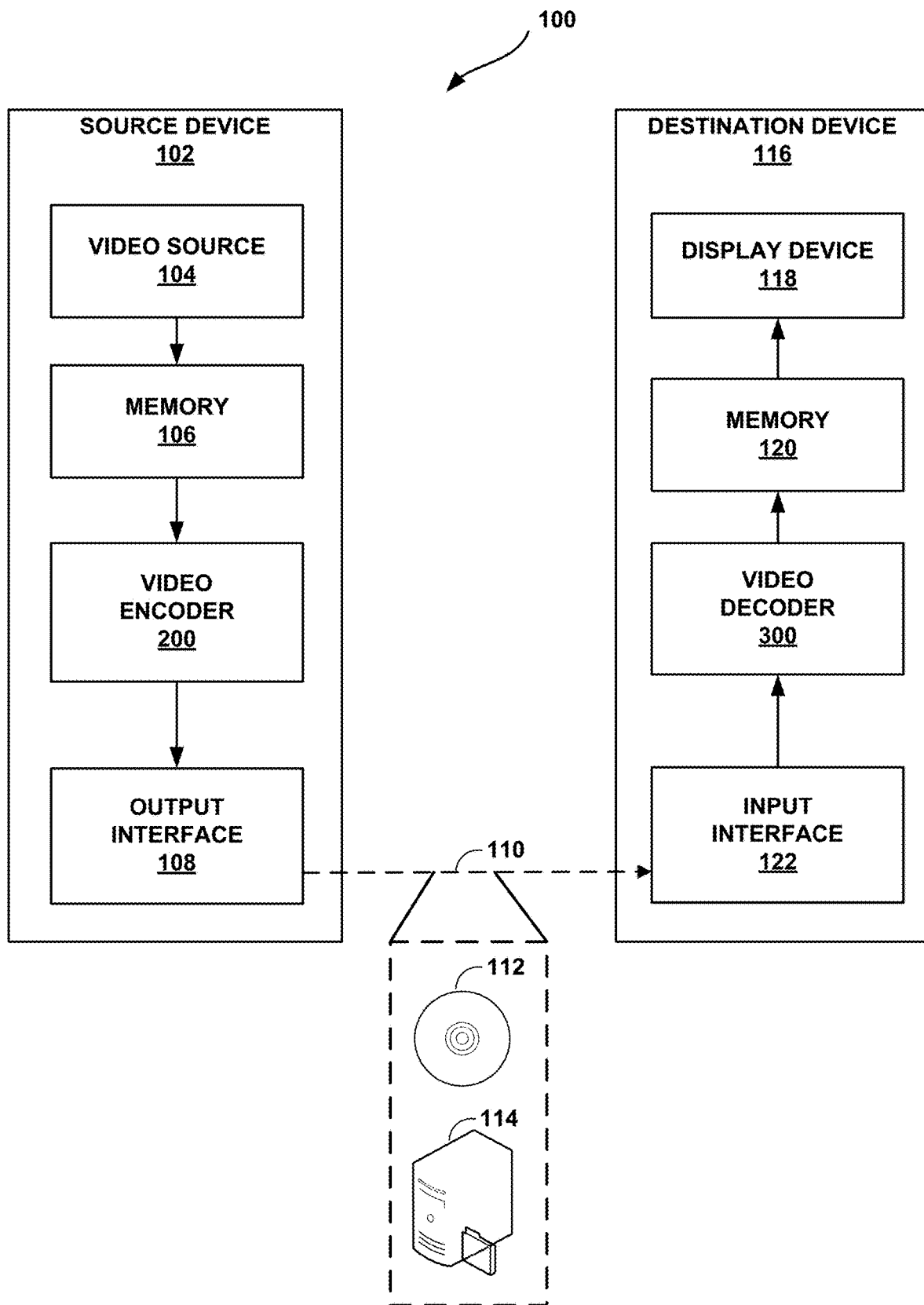
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may be or include any of a wide range of devices, such as desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for DMVR and LIC coding. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for DMVR and LIC coding. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may include any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or nonvolatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 include wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 includes a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder (e.g., audio codec), and may include appropriate MUX-DEMUX units, or other hardware and/or software, to handle multiplexed streams including both audio and video in a common data stream. Example audio codecs may include AAC, AC-3, AC-4, ALAC, ALS, AMBE, AMR, AMR-WB (G.722.2), AMR-WB+, aptx (various versions), ATRAC, BroadVoice (BV16, BV32), CELT, Enhanced AC-3 (E-AC-3), EVS, FLAC, G.711, G.722, G.722.1, G.722.2 (AMR-WB), G.723.1, G.726, G.728, G.729, G.729.1, GSM-FR, HE-AAC, iLBC, iSAC, LA Lyra, Monkey's Audio, MP1, MP2 (MPEG-1, 2 Audio Layer II), MP3, Musepack, Nellymoser Asao, OptimFROG, Opus, Sac, Satin, SBC, SILK, Siren 7, Speex, SVOPC, TrueAudio (TTA), TwinVQ, USAC, Vorbis (Ogg), WavPack, and Windows Media Aud.

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may implement video encoder 200 and/or video decoder 300 in processing circuitry such as an integrated circuit and/or a microprocessor. Such a device may be a wireless communication device, such as a cellular telephone, or any other type of device described herein.

Video encoder 200 and video decoder 300 may operate according to a video coding standard, such as ITU-T H.265, also referred to as High Efficiency Video Coding (HEVC) or extensions thereof, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format. In general, video encoder 200 and video decoder 300 may be configured to perform the techniques of this disclosure in conjunction with any video coding techniques that use DMVR and LIC coding.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of CTUs. Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to CUs.

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may include N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

In accordance with the techniques of this disclosure, as will be described in more detail below, video encoder 200 and video decoder 300 may be configured to code a block of video data using a merge candidate list that includes one or more bi-predicted merge candidates, determine to apply only one of a decoder side motion vector refinement (DMVR) mode or a local illumination compensation (LIC) mode to the block of video data, and apply one of the DMVR mode or the LIC mode to the block of video data based on the determination.

Local Illumination Compensation (LIC)

LIC is an inter prediction technique that models local illumination variations between a current block and its prediction block as a function of that between a current block template and a reference block template. The parameters of the function can be denoted by a scale $\alpha$ and an offset $\beta$, which forms a linear equation, that is, $\alpha*p[x]+\beta$ to compensate illumination changes, where p[x] is a reference sample pointed to by a motion vector (MV) at a location x on the reference picture. Since $\alpha$ and $\beta$ can be derived based on a current block template and a reference block template, no signaling overhead is required for those parameters. An LIC flag may be signaled for AMVP mode to indicate the use of LIC.

The local illumination compensation proposed by V. Seregin, W.-J. Chien, T. Hsieh, N. Hu, M. Karczewicz, C.-M. Tsai, C.-C. Chen, C.-W. Hsu, Y.-W. Huang, S.-M. Lei, H. Chen, X. Ma, H. Yang, "CE4-3.1a and CE4-3.1b: Uni-directional local illumination compensation with affine prediction", JVET-O0066, June 2019 (hereinafter "JVET-O0066") is used for uni-prediction inter CUs with the following modifications.

Intra neighbor samples can be used in LIC parameter derivation;
LIC is disabled for blocks with less than 32 luma samples;
For both non-subblock and affine modes, LIC parameter derivation is performed based on the template block samples corresponding to the current CU, instead of partial template block samples corresponding to first top-left 16×16 unit;

Samples of the reference block template are generated by using motion compensation (MC) with the block MV without rounding it to integer-pel precision.

In X. Xiu, N. Yan, C. Ma, H.-J. Jhu, C.-W. Kuo, W. Chen, X. Wang, "EE2-Test2.7: Improvements on local illumination compensation", JVET-AD0213, April 2023 (hereinafter "JVET-AD0213"), LIC mode is extended to bi-predictive CUs and is adopted into the Enhanced Compression Model (ECM), where two different linear models are applied to the two prediction blocks which are then combined to generate the bi-prediction samples of the current CU. An example follows where:

$$P'[x, y] = (1 - \omega) \cdot p'_0[x, y] + \omega \cdot p'_1[x, y]$$

and $$p'_0[x, y] = \alpha_0 \cdot P_0[x, y] + \beta_0$$
$$p'_1[x, y] = \alpha_1 \cdot P_1[x, y] + \beta_1$$

where $\alpha_0$ and $\beta_0$, and $\alpha_1$ and $\beta_1$ indicate the scales and the offsets in L0 and L1, respectively; $\omega$ indicates the weight (as indicated by the CU-level BCW index) for the weighted combination of L0 and L1 predictions.

The method includes first deriving the reference list 0 (L0) parameters by minimizing a difference between L0 template prediction $T_0$ and the template T and the samples in T are updated by subtracting the corresponding samples in $T_0$. Then, the reference list 1 (L1) parameters are calculated that minimizes the difference between L1 template prediction $T_1$ and the updated template. Finally, the L0 parameter is refined again in the same way.

Following the current LIC design, one flag is signalled for AMVP bi-predicted CUs for the indication of the LIC mode while the flag is inherited for merge related inter CUs. Additionally, the LIC mode is disabled for decoder side motion vector refinement (DMVR) and bi-directional optical flow (BDOF) modes.

Bilateral Matching

Bilateral matching (BM) is a technique that refines a pair of two initial motion vectors MV0 and MV1. Generally, BM mode includes searching around MV0 and MV1 to derive refined MVs MV0' and MV1' that minimize a block matching cost. The block matching cost measures the similarity between the two motion compensated predictors generated by the two MVs. Some typical criterions are: sum of absolute difference (SAD), sum of absolute transformed difference (SATD), and sum of square error (SSE), among others. The matching cost may also include a regularization term that is derived based on the MV differences between the current MV pair and the initial MV pair. Some certain constraints may also be applied to the MV differences between MVD0 (MV0'-MV0) and MVD1 (MV1'-MV1). Typically, it is assumed that MVD0 and MVD1 shall be proportional to the temporal distances (TD) between the current picture and the reference pictures pointed to by the two MVs. However, in some applications, the BM process may be designed with the assumption that MVD0 is equal to −MVD1.

Decoder Side Motion Vector Refinement

Figure 6:
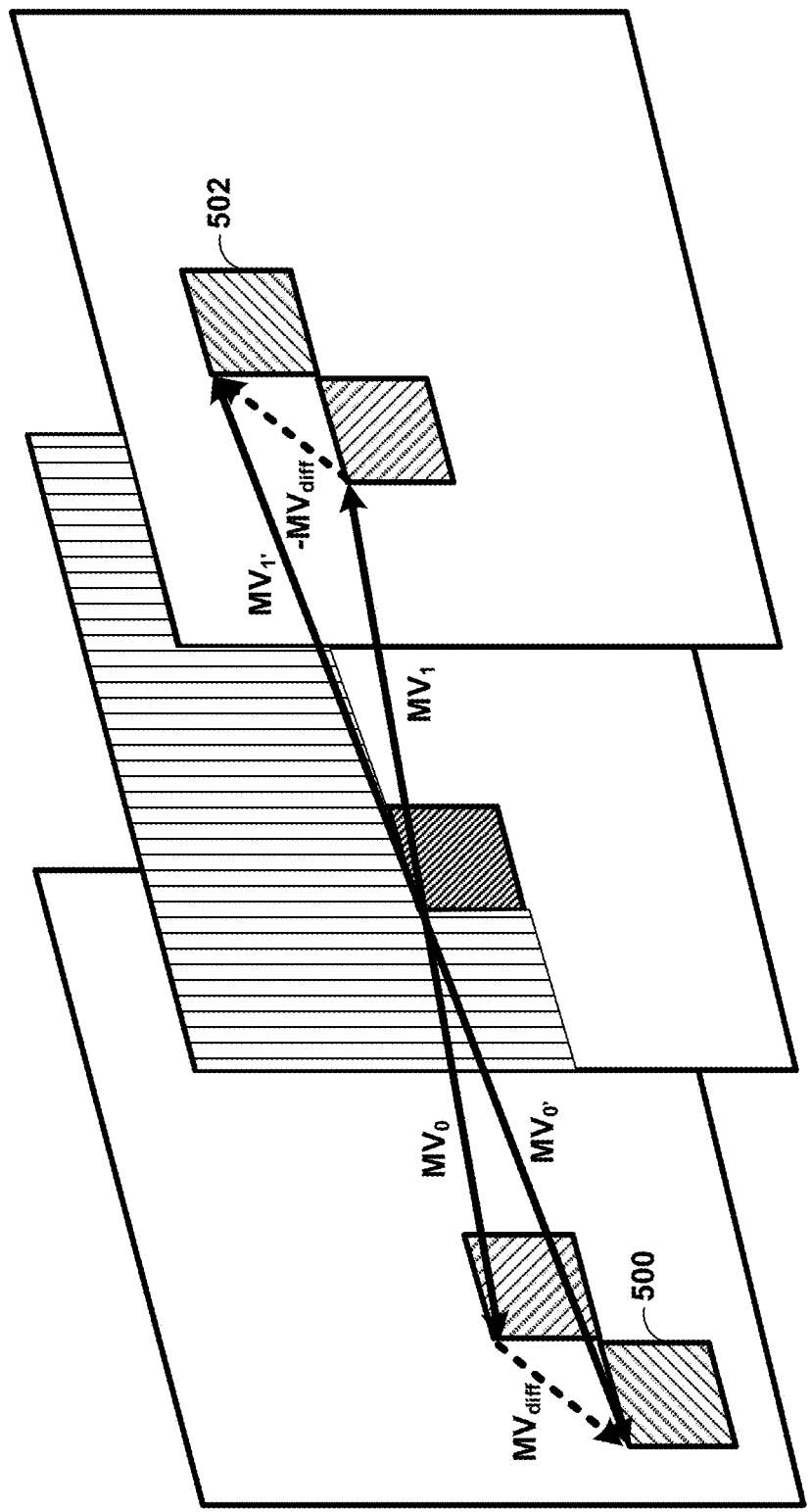
FIG. 6 is a conceptual diagram illustrating an example of decoder side motion vector refinement.

In the Versatile Video Coding (VVC) standard, the bilateral-matching based decoder side motion vector refinement (DMVR) is applied to increase the accuracy of the MVs of a bi-prediction merge candidate. The BM method calculates the SAD between the two candidate blocks in the reference picture list L0 and list L1. As illustrated in FIG. 6, the SAD between block 500 and block 502 based on each MV candidate around the initial MV is calculated. The MV candidate with the lowest SAD becomes the refined MV and used to generate the bi-predicted signal. The SAD of the initial MVs is subtracted by ¼ of the SAD value to serve as regularization term. The temporal distances (e.g., Picture Order Count (POC) difference) from two reference pictures to the current picture shall be the same. Therefore, MVD0 is just the opposite sign of MVD1.

The refinement search range is two integer luma samples from the initial MV. The searching includes the integer sample offset search stage and fractional sample refinement stage. 25 points full search is applied for integer sample offset searching. The SAD of the initial MV pair is first calculated. If the SAD of the initial MV pair is smaller than a threshold, the integer sample stage of DMVR is terminated. Otherwise, the SADs of the remaining 24 points are calculated and checked in raster scanning order. The point with the smallest SAD is selected as the output of integer sample offset searching stage.

The integer sample search is followed by fractional sample refinement. To limit computational complexity, the fractional sample refinement is derived using a parametric error surface equation, instead of additional search with SAD comparison. The fractional sample refinement is conditionally invoked based on the output of the integer sample search stage. When the integer sample search stage is terminated with the center having the smallest SAD in either the first iteration or the second iteration search, the fractional sample refinement is further applied.

In parametric error surface based sub-pixel offsets estimation, the center position cost and the costs at four neighboring positions from the center are used to fit a 2-D parabolic error surface equation of the following form:

$$E(x, y) = A(x - x_{min})^2 + B(y - y_{min})^2 + C, \quad (1)$$

where $(x_{min}, y_{min})$ corresponds to the fractional position with the least cost and C corresponds to the minimum cost value. By solving the above equations by using the cost value of the five search points, the $(x_{min}, y_{min})$ is computed as:

$$x_{min} = (E(-1, 0) - E(1, 0))/(2(E(-1, 0) + E(1, 0) - 2E(0, 0))) \quad (2)$$
$$y_{min} = (E(0, -1) - E(0, 1))/(2((E(0, -1) + E(0, 1) - 2E(0, 0))) \quad (3)$$

The value of $x_{min}$ and $y_{min}$ are automatically constrained to be between −8 and 8 since all cost values are positive and the smallest value is E(0,0). This corresponds to a half-pel offset with ¹⁄₁₆th-pel MV accuracy in VVC. The computed fractional $(x_{min}, y_{min})$ are added to the integer distance refinement MV to obtain the sub-pixel accurate refinement delta MV.

In VVC, the resolution of the MVs is ¹⁄₁₆ luma samples. The samples at the fractional position are interpolated using a 8-tap interpolation filter. In DMVR, the search points surround the initial fractional-pel MV with integer sample offset. Therefore, the samples of those fractional position may be interpolated for the DMVR search process. To reduce the calculation complexity, a bi-linear interpolation filter is used to generate the fractional samples for the searching process in DMVR.

Another effect is that, by using bi-linear filter with a 2-sample search range, the DVMR process does not access more reference samples compared to the normal motion compensation process. After the refined MV is obtained with the DMVR search process, the normal 8-tap interpolation filter is applied to generate the final prediction. In order to not access more reference samples relative to a normal motion compensation process, the samples which are not used for the interpolation process based on the original MV but are used for the interpolation process based on the refined MV, will be padded from those available samples.

When the width and/or height of a CU is larger than 16 luma samples, the CU will be further split into subblocks with width and/or height equal to 16 luma samples for the DMVR process.

In VVC, the DMVR process can be applied for the CUs which are coded with following modes and features:
CU level merge mode with bi-prediction MV
One reference picture is in the past and another reference picture is in the future with respect to the current picture
The distances (e.g., POC difference) from two reference pictures to the current picture are same
Both reference pictures are short-term reference pictures
CU has more than 64 luma samples
Both CU height and CU width are larger than or equal to 8 luma samples
Bi-prediction with CU level weights (BCW) weight index indicates equal weight
Weighted prediction (WP) is not enabled for the current block
Combined Inter-Intra Prediction (CIIP) mode is not used for the current block In ECM, the conditions are simplified as follows:
CU level merge mode or AMVP-merge mode with bi-prediction MV
One reference picture is in the past and another reference picture is in the future with respect to the current picture
The distances (e.g., POC difference) from two reference pictures to the current picture are same
Merge with motion vector difference (MMVD) mode is not used for the current block
Both reference pictures are not scaled
WP is not enabled for the current block
CIIP mode is not used for the current block Affine Mode
An affine motion model can be described as follows:

$$\begin{cases} v_x = ax + by + e \\ v_y = cx + dy + f \end{cases}$$

wherein $(v_x, v_y)$ is the motion vector at the coordinate (x,y), and a, b, c, d, e, and f are the six affine parameters. We will refer to this affine motion model as a 6-parameter affine motion model. In a typical video coder, a picture is partitioned into blocks for block-based coding. The affine motion model for a block can also be described by the 3 motion vectors (MVs) $\vec{v}_0=(v_{0x},v_{0y})$, $\vec{v}_1=(v_{1x}, v_{1y})$, and $\vec{v}_2=(v_{2x}, v_{2y})$ at 3 different locations that are not in the same line. The 3 locations are usually referred to as control-points and the 3 motion vectors are referred to as control-point motion vectors (CPMVs). In the case when the 3 control-points are at the 3 corners of the block, the affine motion can be described as:

$$\begin{cases} v_x = \frac{(v_{1x} - v_{0x})}{blkW}x + \frac{(v_{2x} - v_{0x})}{blkH}y + v_{0x} \\ v_y = \frac{(v_{1y} - v_{0y})}{blkW}x + \frac{(v_{2y} - v_{0y})}{blkH}y + v_{0y} \end{cases}$$

wherein blkW and blkH are the width and height of the block.

In affine mode, different motion vectors can be derived for each pixel in the block according to the associated affine motion model. Therefore, motion compensation can be performed pixel-by-pixel. However, to reduce the complexity, subblock-based motion compensation may be used, wherein the block is partitioned into multiple subblocks (that have smaller block size) and each subblock is associated with one motion vector for block-based motion compensation. The motion vector for each subblock is derived using the representative coordinate of the subblock. Typically, the center position is used.

In one example, the block is partitioned into non-overlapping subblocks. The block width is blkW, block height is blkH, the subblock width is sbW, and subblock height is sbH. Then there are blkH/sbH rows of subblocks and blkW/sbW subblocks in each row. For a six-parameter affine motion model, the motion vector for the subblock (referred to as subblock MV) at $i_{th}$ row (0<=i<blkW/sbW) and $j_{th}$ (0<=j<blkH/sbH) column is derived as:

$$\begin{cases} v_x = \frac{(v_{1x} - v_{0x})}{blkW}\left(j*sbW + \frac{sbW}{2}\right) + \frac{(v_{2x} - v_{0x})}{blkH}\left(i*sbH + \frac{sbH}{2}\right) + v_{0x} \\ v_y = \frac{(v_{1y} - v_{0y})}{blkW}\left(j*sbW + \frac{sbW}{2}\right) + \frac{(v_{2y} - v_{0y})}{blkH}\left(i*sbH + \frac{sbH}{2}\right) + v_{0y} \end{cases}$$

The subblock MVs are rounded to a predefined precision and stored in the motion buffer for motion compensation and motion vector prediction.

A simplified 4-parameters affine model (for zoom and rotational motion) is described as follows:

$$\begin{cases} v_x = ax - by + e \\ v_y = cx + ay + f \end{cases}$$

Similarly, the 4-parameters affine model for a block can be described by 2 CPMVs $\vec{v}_0=(v_{0x},v_{0y})$ and $\vec{v}_1=(v_{1x},v_{1y})$ at the 2 corners (typically top-left and top-right) of the block. The motion field is then described as:

$$\begin{cases} v_x = \frac{(v_{1x} - v_{0x})}{blkW}x - \frac{(v_{1y} - v_{0y})}{blkW}y + v_{0x} \\ v_y = \frac{(v_{1y} - v_{0y})}{blkW}x + \frac{(v_{1x} - v_{0x})}{blkW}y + v_{0y} \end{cases}$$

The subblock MV at $i_{th}$ row and $j_{th}$ column is derived as:

$$\begin{cases} v_x = \frac{(v_{1x} - v_{0x})}{blkW}\left(j*sbW + \frac{sbW}{2}\right) - \frac{(v_{1y} - v_{0y})}{blkW}\left(i*sbH + \frac{sbH}{2}\right) + v_{0x} \\ v_y = \frac{(v_{1y} - v_{0y})}{blkW}\left(j*sbW + \frac{sbW}{2}\right) + \frac{(v_{1x} - v_{0x})}{blkW}\left(i*sbH + \frac{sbH}{2}\right) + v_{0y} \end{cases}$$

Decoder Side Motion Vector Refinement for Affine Merge Mode

In J. Chen, R.-L. Liao, X. Li, Y. Ye, "Non-EE2: DMVR for affine merge coded blocks," JVET-AA0144, July 2022 (hereinafter "JVET-AA0144"), decoder side motion vector refinement (DMVR) is proposed for bi-directional predicted affine merge candidate. A translation MV offset is added to all the CPMVs of the candidate in the affine merge list if the candidate meets the DMVR condition. The MV offset is derived by minimizing the cost of bilateral matching, which is similar to the conventional DMVR. The difference is that the affine motion compensation is performed to generate predictors in both directions. The MV offset searching process is the same as the DMVR (prediction unit level) in ECM. A 3×3 square search pattern is used to loop through the search range [−8, +8] in a horizontal direction and [−8, +8] in a vertical direction to find the best integer MV offset. Then, a half-pel search is conducted around the best integer position and an error surface estimation is performed at last to find a MV offset with $1/16$ precision.

To calculate the bilateral matching cost (for the given bi-directional affine motion), the following steps apply:
1) The offset is first added to each of the CPMVs in both directions to update the CPMVs.
2) Affine motion compensation is applied according to the updated CPMVs to generate the predictors in both directions.
3) Calculate the distortion between the generated predictors using the predefined cost criterion.

In some examples, affine motion compensation is sub-block based, wherein the current block is partitioned into non-overlapping subblocks. Regular motion compensation is performed for each of the subblock (all samples in the subblock share the same motion). In VVC, prediction refinement with optical flow (PROF) may be applied after the subblock based motion compensation to further improve the predictor.

In co-pending U.S. Provisional Application No. 63/368, 576, filed Jul. 15, 2022, a less complex and more practical DMVR design for affine motion model is disclosed. The DMVR design can be summarized in the following steps:
1) Divide the current block into subblocks.
2) Generate initial motion vectors (of both prediction directions) for each subblock (subblock motion fields) according to the initial affine motion model.
3) Loop over each subblock, calculating subblock bilateral matching costs for all possible offsets.
4) For each possible offset, accumulate the subblock bilateral matching costs to generate the bilateral matching cost corresponding to the entire block.
5) Determine the best offset by selecting the offset with minimum bilateral matching cost corresponding to the entire block.

In co-pending U.S. Provisional Application No. 63/377, 659, filed Sep. 29, 2022, subblock skipping or subsampling is disclosed to further reduce complexity, wherein a subset of subblocks may be used during the affine DMVR process.

Adaptive Decoder Side Motion Vector Refinement

The general idea of adaptive DMVR is to allow different coded blocks to be coded with a different search strategy/ method for bilateral matching. The selected search strategy for a block is signaled as some syntax element(s) that is(are) coded in the bitstream. The search strategy includes a constraint/relationship between MVD0 and MVD1 that is imposed during the bilateral matching search process.

One of the following constraints between MVD0 and MVD1 is selected per bilateral matching block:

1) Mirroring MVD: MVD0 and MVD1 have the same magnitude, but opposite sign, i.e. MVD0=−MVD1 (original DMVR);
2) MVD0 is zero (both x and y components are zero), i.e. MV0 is fixed while searching around MV1 to derived refined MV1', and MV0' is equal to MV0 (adaptive DMVR);
3) MVD1 is zero, i.e. MV1 is fixed while searching around MV0 to derive MV0', and MV1' is equal to MV1 (adaptive DMVR).

A first syntax element is signaled representing the mode information (whether regular DMVR or adaptive DMVR shall be applied). The above mentioned three options are classified by the first syntax element. Option 1) applies regular DMVR to a coded block when a regular merge candidate stratifies the DVMR conditions and option 2) or 3) is applied when the coded block uses the designated new merge mode wherein all candidates shall also meet the designated DMVR conditions. Constraint 2) and 3) are further distinguished by a mode flag or merge index.

Adaptive Decoder Side Motion Vector Refinement for Affine Merge Mode

Adaptive affine decoder side motion vector refinement allows further refinement flexibility with additional signaling for affine merge candidate that meet the DMVR condition. Compared to affine decoder side motion vector refinement, the general idea of adaptive affine DMVR is to set the MVD of one of the reference lists to be (0, 0). In this way, instead of refining both reference lists simultaneously, only one of the predictors from a given reference list is refined. Adaptive affine DMVR is an extension of regular adaptive DMVR method as described above. The BM cost is derived for each of the sub-blocks instead of the whole CU and the BM cost is accumulated for each of the sub-blocks for the final cost to determine the best MVD. Additional coding benefits can be observed since, in some cases, one of the predictors might already be accurate and only the other predictors need to be refined. Together with the original affine decoder side motion vector refinement, for each affine merge candidate that meets the DMVR condition, in one example, a total of three different refinement options can be provided:
1) Original affine DMVR that mirroring MVD: MVD0 and MVD1 have the same magnitude, but opposite sign, i.e. MVD0=−MVD1;
2) MVD0 is zero (both x and y components are zero), for each sub-block in affine CU, MV0 is fixed while BM cost is derived within the search range of MV1, the accumulated BM cost is used to decide the final MVD1 for each CPMV of reference list 1;
3) MVD1 is zero, for each sub-block in affine CU, MV1 is fixed while BM cost is derived within the search range of MV0, the accumulated BM cost is used to decide the final MVD0 for each CPMV of reference list 0.

With the introduction of multiple refinement options, signaling of additional syntax may be performed. A first syntax is used to indicate whether option 1) is used. If the first syntax indicates option 1) is not used, a second syntax is signaled to indicate whether option 2) or 3) is used.

EXAMPLES

The merge candidates that are used as the input for DMVR mode, adaptive DMVR mode, affine DMVR mode, and adaptive affine DMVR mode are bi-predicted candidates. With the extension of LIC (Local Illumination Compensation) mode to bi-predicted CUs, if a bi-predicated merge candidate satisfies the DMVR condition, as described above, and has an inherited LIC flag equal to true, video encoder 200 and video decoder 300 may be configured to apply both DMVR mode and bi-prediction LIC mode to a block of video data. For DMVR mode, video encoder 200 and video decoder 300 may be configured to perform multiple search stages with an integer pel search followed by a half-pel search and a trailing parametric error surface based sub-pixel offsets estimation. For bi-prediction LIC mode, video encoder 200 and video decoder 300 may be configured to perform up to three iterations of LIC parameter estimation. Video encoder 200 and video decoder 300 may be configured to iteratively update the LIC parameters for reference picture list 0 and reference picture list 1 in an alternating manner.

Both DMVR mode and bi-predicted LIC mode are complicated with multiple search rounds or iterations. This complexity not only occurs at the video encoder 200, but also at video decoder 300, which is not desirable for all use cases. To address this issue, and lower the complexity of video encoding and video decoding, this disclosure describes the following techniques to determine to perform either DMVR mode or bi-predicted LIC mode.

Interaction Between Bi-Predicted LIC and DMVR/Affine DMVR

In a first example of the disclosure, video encoder 200 and video decoder 300 may be configured to avoid performing both DMVR/affine DMVR and bi-predicted LIC in the following situation. That is, video encoder 200 and video decoder 300 may be configured to determine to perform one of DMVR/affine DMVR or bi-predicted LIC for a block of video data. In one example, when constructing the regular inter merge candidate list or affine merge candidate list, in the case a bi-predicted merge candidate satisfies the DMVR condition and has an inherited LIC flag equals to true, video encoder 200 and video decoder 300 are configured to set the LIC flag to be false. As such, both video encoder 200 and video decoder 300 will only perform DMVR/affine DMVR, and will not perform bi-predicted LIC.

In a second example, in case a bi-predicted merge candidate satisfies the DMVR/affine DMVR condition and has an inherited LIC flag equals to true, video encoder 200 and video decoder 300 may duplicate the bi-predicted merge candidate with the same information for the regular inter merge candidate list or the affine merge candidate list, except for the value of the true LIC flag. For the two duplicated bi-predicted merge candidates, one of the bi-predicted merge candidates will have its LIC flag inherited to be true and the other bi-predicted merge candidate will have an LIC flag set to false. Video encoder 200 and video decoder 300 may be configured to perform an additional LIC flag check to the DMVR/affine DMVR condition check such that when the LIC flag is true, DMVR/affine DMVR will not be performed. As such, depending on what bi-predicted merge candidate in the regular inter merge candidate list or the affine merge candidate list is ultimately used, video encoder 200 and video decoder 300 will perform only one of DMVR/affine DMVR or bi-predicted LIC.

In a third example, only the LIC flag check as described in the second example is added to the DMVR/affine DMVR conditions check, while the LIC flag is still inherited for any candidates. That is, video encoder 200 and video decoder 300 may be configured to perform an additional LIC flag check to the DMVR/affine DMVR condition check such that when the LIC flag is true, DMVR/affine DMVR will not be performed. In this way if the LIC flag is true, DMVR/affine DMVR will be bypassed (e.g., not performed), and LIC will be performed by video encoder 200 and video decoder 300.

In any of the examples above, video encoder 200 and video decoder 300 may be configured to perform DMVR mode, affine DMVR mode, or LIC mode according to the techniques described above, or according to any other version of DMVR, affine DMVR, or LIC.

Interaction Between Bi-Predicted LIC and Adaptive DMVR/Adaptive Affine DMVR

For adaptive DMVR and adaptive affine DMVR, video encoder 200 and video decoder 300 may construct a specific merge list, namely an adaptive DMVR merge candidate list or adaptive affine DMVR merge candidate list, which only contains candidates that meets the DMVR refinement conditions. In this case, if the inherited LIC flag is true, video encoder 200 and video decoder 300 would normatively be configured to perform both DMVR and LIC. As described above, applying both DMVR and LIC together may be unwanted. To address this problem, in one example, even if the inherited LIC flag is true, video encoder 200 and video decoder 300 may be configured to modify the LIC flag to be false and only perform adaptive DMVR or adaptive affine DMVR.

In a second example, if the inherited LIC flag is true for a particular candidate, video encoder 200 and video decoder 300 may be configured to not add that particular candidate to a candidate list (e.g., a regular or affine merge candidate list). In this way, video encoder 200 and video decode 300 may be configured to not perform LIC mode, and will instead perform adaptive DMVR and adaptive affine DMVR for any candidate selected from the list.

In a third example, video encoder 200 and video decoder 300 are configured to duplicate a candidate with an inherited LIC flag being true in a merge candidate list with the same information except for the LIC flag. For the two duplicated candidates, one of the candidates will have its LIC flag inherited to be true and the other candidate will have an LIC flag set to false. An additional LIC flag check will be added to the DMVR condition check such that when the LIC flag is true, video encoder 200 and video decoder 300 will not perform adaptive DMVR or adaptive affine DMVR.

In another example, only the LIC flag check as described in the third example is added to the DMVR condition check while the LIC flag is still inherited. In this way if the LIC flag is true, video encoder 200 and video decoder 300 will not perform adaptive DMVR or adaptive affine DMVR.

Unification of DMVR Conditions and LIC Flag Inheritance

It is preferable to align the solutions for all of the four DMVR modes for design consistency purposes. In one example, the LIC flag check is additionally added to the DMVR condition checks and the LIC flag is always inherited. In this way, when both the original DMVR condition checks are met and the LIC flag is true, LIC will be applied. This gives a higher priority to LIC compared to DMVR. Only when LIC flag is false and original DMVR condition checks are met will DMVR be used.

In a second example, if a merge candidate meets the DMVR conditions, the LIC flag will be set to false. This gives a higher priority to DMVR compared to LIC.

In another example, duplicated candidates with LIC flag set to false when the inherited LIC flag is true are additionally added to the merge list. The LIC flag check is also additionally added on top of the DMVR conditions. This solution allows more varieties with one candidate refined by DMVR and the other candidate refined by LIC.

Other Techniques to Apply both DMVR and Bi-predicted LIC

The complexity of bi-predicted LIC mainly lies in the iterative derivation process of the LIC parameters for both reference lists. However, the LIC parameter derivation can be skipped by inheriting the LIC parameters from the same CU from which the LIC flag is inherited to be true. In this way, LIC parameters can be directly used. Only a scaling and an add operation for each sample in each predictor is needed to accomplish the LIC process. With the inheritance of the LIC parameters, DMVR and bi-predicted LIC can be performed jointly with reduced complexity.

The following is a summary of the techniques of the disclosure in view of the examples above. In general, video encoder 200 and video decoder 300 may be configured to code a block of video data using a merge candidate list that includes one or more bi-predicted merge candidates, determine to apply only one of a decoder side motion vector refinement (DMVR) mode or a local illumination compensation (LIC) mode to the block of video data, and apply one of the DMVR mode or the LIC mode to the block of video data based on the determination.

In one example, to determine to apply only one of the DMVR mode or the LIC mode to the block of video data, video encoder 200 and video decoder 300 may be configured to determine that a bi-predicted merge candidate in the merge candidate list meets conditions for applying the DMVR mode and has an LIC flag set to true, set the LIC flag to false, and determine to apply DMVR mode based on the bi-predicted merge candidate being used.

In another example, to determine to apply only one of the DMVR mode or the LIC mode to the block of video data, video encoder 200 and video decoder 300 may be configured to determine that a bi-predicted merge candidate in the merge candidate list meets conditions for applying the DMVR mode and has an LIC flag set to true, create a duplicate of the bi-predicted merge candidate that has the LIC flag set to false, determine to apply only the LIC mode to the block of video data based on the bi-predicted merge candidate being used, and determine to apply only the DMVR mode to the block of video data based on duplicate of the bi-predicted merge candidate being used.

In another example, to determine to apply only one of the DMVR mode or the LIC mode to the block of video data, video encoder 200 and video decoder 300 may be configured to determine a bi-predicted merge candidate in the merge candidate list meets conditions for applying the DMVR mode and has an LIC flag set to true, and determine to apply only the LIC mode to the block of video data based on the bi-predicted merge candidate being used.

In another example, to determine to apply only one of the DMVR mode or the LIC mode to the block of video data, video encoder 200 and video decoder 300 may be configured to determine a bi-predicted merge candidate meets conditions for applying the DMVR mode and has an LIC flag set to true, refrain from adding the bi-predicted merge candidate to the merge candidate list, and determining to apply only the LIC mode to the block of video data based on the a selected merge candidate from the merge candidate list.

Figure 2:
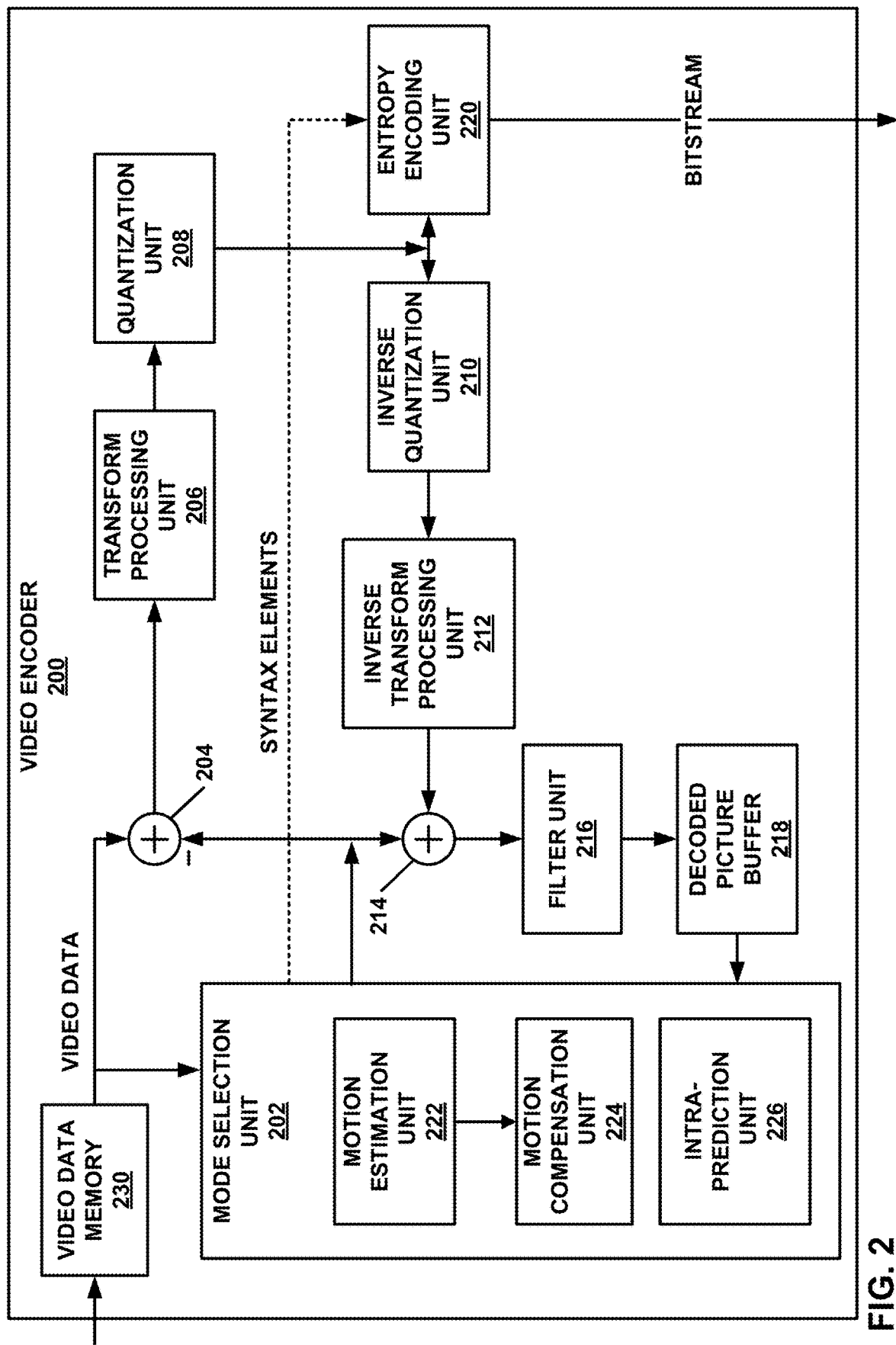
FIG. 2 is a block diagram illustrating an example video encoder that may perform the techniques of this disclosure.

FIG. 2 is a block diagram illustrating an example video encoder 200 that may perform the techniques of this disclosure. FIG. 2 is provided for purposes of explanation and should not be considered limiting of the techniques as broadly exemplified and described in this disclosure. For purposes of explanation, this disclosure describes video encoder 200 according to the techniques of VVC and HEVC. However, the techniques of this disclosure may be performed by video encoding devices that are configured to other video coding standards and video coding formats, such as AV1 and successors to the AV1 video coding format.

In the example of FIG. 2, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 2 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the MTT structure, QTBT structure, superblock structure, or the quad-tree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

When operating according to the AV1 video coding format, intra-prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 220 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to code a block of video data using a merge candidate list that includes one or more bi-predicted merge candidates, determine to apply only one of a decoder side motion vector refinement (DMVR) mode or a local illumination compensation (LIC) mode to the block of video data, and apply one of the DMVR mode or the LIC mode to the block of video data based on the determination.

Figure 3:
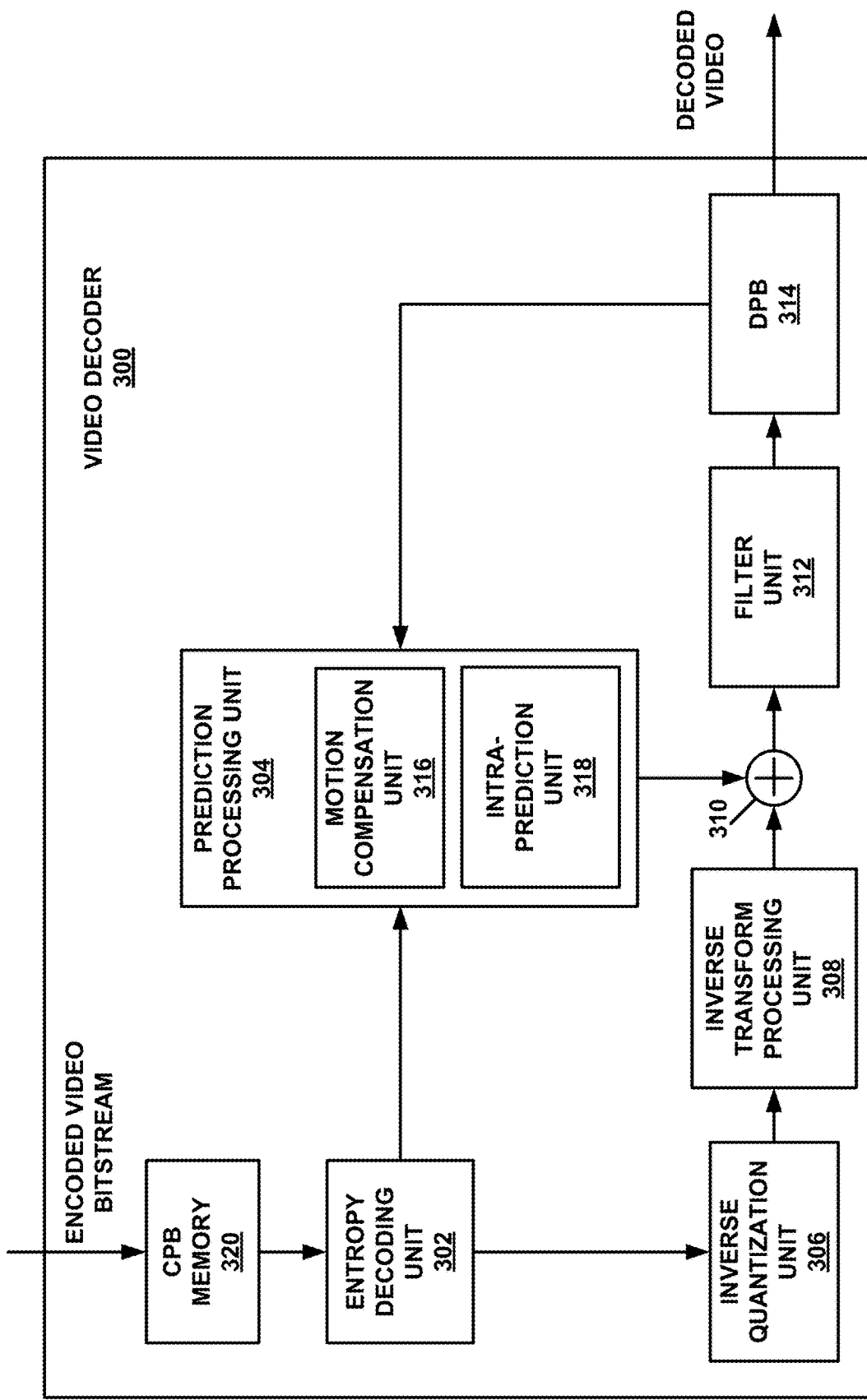
FIG. 3 is a block diagram illustrating an example video decoder that may perform the techniques of this disclosure.

FIG. 3 is a block diagram illustrating an example video decoder 300 that may perform the techniques of this disclosure. FIG. 3 is provided for purposes of explanation and is not limiting on the techniques as broadly exemplified and described in this disclosure. For purposes of explanation, this disclosure describes video decoder 300 according to the techniques of VVC and HEVC. However, the techniques of this disclosure may be performed by video coding devices that are configured to other video coding standards.

In the example of FIG. 3, video decoder 300 includes coded picture buffer (CPB) memory 320, entropy decoding unit 302, prediction processing unit 304, inverse quantization unit 306, inverse transform processing unit 308, reconstruction unit 310, filter unit 312, and DPB 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

When operating according to AV1, motion compensation unit 316 may be configured to decode coding blocks of video data (e.g., both luma and chroma coding blocks) using translational motion compensation, affine motion compensation, OBMC, and/or compound inter-intra prediction, as described above. Intra-prediction unit 318 may be configured to decode coding blocks of video data (e.g., both luma and chroma coding blocks) using directional intra prediction, non-directional intra prediction, recursive filter intra prediction, CFL, IBC, and/or color palette mode, as described above.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 3 are illustrated to assist with understanding the operations performed by video decoder 300. The units may be implemented as fixed-function circuits, programmable circuits, or a combination thereof. Similar to FIG. 2, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 2).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 2). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to code a block of video data using a merge candidate list that includes one or more bi-predicted merge candidates, determine to apply only one of a decoder side motion vector refinement (DMVR) mode or a local illumination compensation (LIC) mode to the block of video data, and apply one of the DMVR mode or the LIC mode to the block of video data based on the determination.

Figure 4:
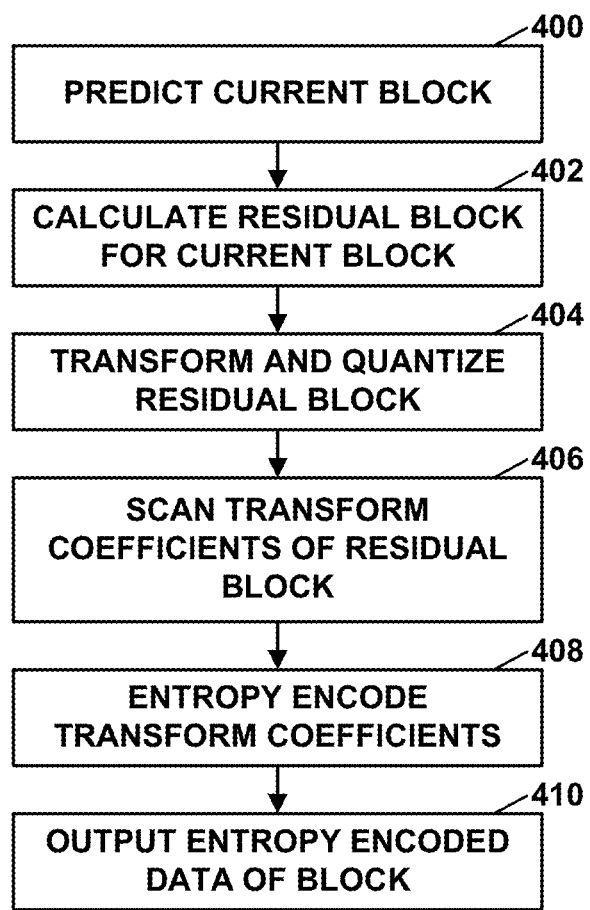
FIG. 4 is a flowchart illustrating an example method for encoding a current block in accordance with the techniques of this disclosure.

FIG. 4 is a flowchart illustrating an example method for encoding a current block in accordance with the techniques of this disclosure. The current block may be or include a current CU. Although described with respect to video encoder 200 (FIGS. 1 and 2), it should be understood that other devices may be configured to perform a method similar to that of FIG. 4.

In this example, video encoder 200 initially predicts the current block (400). For example, video encoder 200 may form a prediction block for the current block. Video encoder 200 may then calculate a residual block for the current block (402). To calculate the residual block, video encoder 200 may calculate a difference between the original, unencoded block and the prediction block for the current block. Video encoder 200 may then transform the residual block and quantize transform coefficients of the residual block (404). Next, video encoder 200 may scan the quantized transform coefficients of the residual block (406). During the scan, or following the scan, video encoder 200 may entropy encode the transform coefficients (408). For example, video encoder

200 may encode the transform coefficients using CAVLC or CABAC. Video encoder 200 may then output the entropy encoded data of the block (410).

Figure 5:
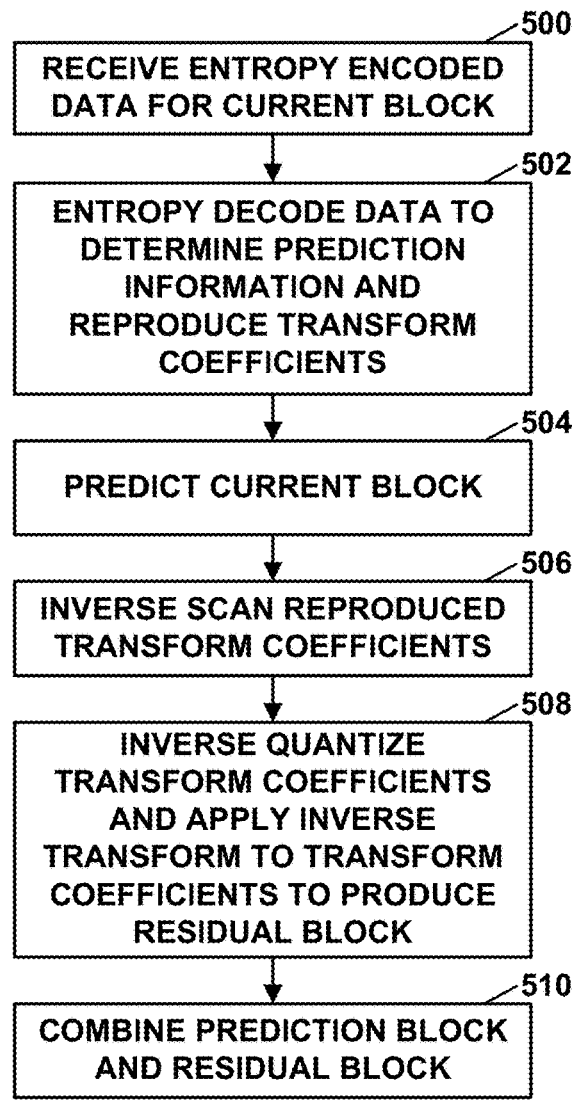
FIG. 5 is a flowchart illustrating an example method for decoding a current block in accordance with the techniques of this disclosure.

FIG. 5 is a flowchart illustrating an example method for decoding a current block of video data in accordance with the techniques of this disclosure. The current block may be or include a current CU. Although described with respect to video decoder 300 (FIGS. 1 and 3), it should be understood that other devices may be configured to perform a method similar to that of FIG. 5.

Video decoder 300 may receive entropy encoded data for the current block, such as entropy encoded prediction information and entropy encoded data for transform coefficients of a residual block corresponding to the current block (500). Video decoder 300 may entropy decode the entropy encoded data to determine prediction information for the current block and to reproduce transform coefficients of the residual block (502). Video decoder 300 may predict the current block (504), e.g., using an intra- or inter-prediction mode as indicated by the prediction information for the current block, to calculate a prediction block for the current block. Video decoder 300 may then inverse scan the reproduced transform coefficients (506), to create a block of quantized transform coefficients. Video decoder 300 may then inverse quantize the transform coefficients and apply an inverse transform to the transform coefficients to produce a residual block (508). Video decoder 300 may ultimately decode the current block by combining the prediction block and the residual block (510).

Figure 7:
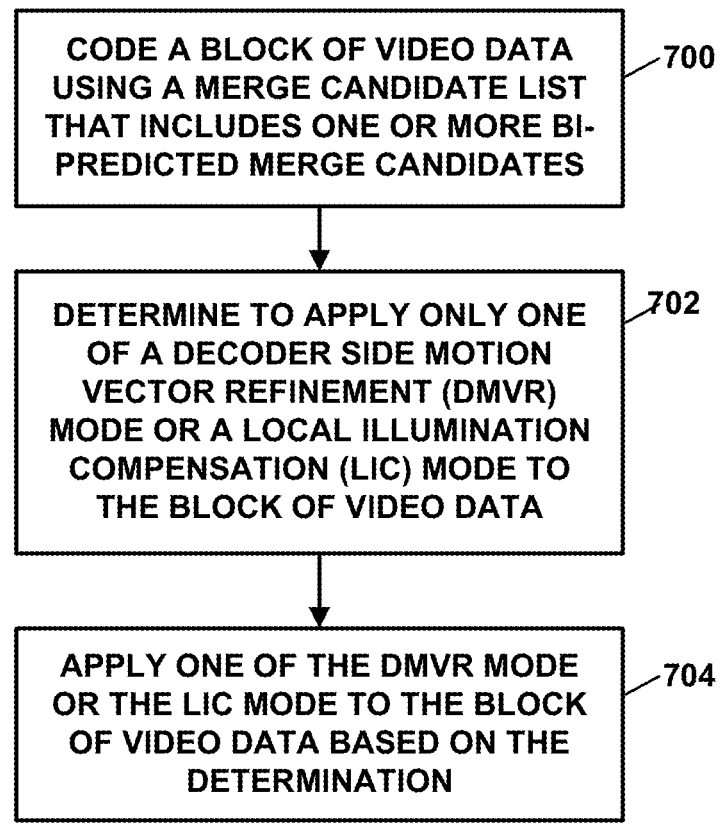
FIG. 7 is a flowchart illustrating an example method for coding a current block in accordance with the techniques of this disclosure.

FIG. 7 is a flowchart illustrating an example method for coding a current block in accordance with the techniques of this disclosure. The techniques of FIG. 7 may be performed by video encoder 200 and video decoder 300.

Video encoder 200 and video decoder 300 may be configured to code (e.g., encode or decode, respectively) a block of video data using a merge candidate list that includes one or more bi-predicted merge candidates (700). Video encoder 200 and video decoder 300 may determine to apply only one of a decoder side motion vector refinement (DMVR) mode or a local illumination compensation (LIC) mode to the block of video data (702), and apply one of the DMVR mode or the LIC mode to the block of video data based on the determination (704). In one example, the DMVR mode is one of a regular DMVR mode, an affine DMVR mode, an adaptive DMVR mode, or an adaptive affine DMVR mode. The merge candidate list may be a regular merge candidate list or an affine merge candidate list.

In one example, to determine to apply only one of the DMVR mode or the LIC mode to the block of video data, video encoder 200 and video decoder 300 are configured to determine that a bi-predicted merge candidate in the merge candidate list meets conditions for applying the DMVR mode and has an LIC flag set to true, set the LIC flag to false, and determine to apply DMVR mode based on the bi-predicted merge candidate being used.

In another example, to determine to apply only one of the DMVR mode or the LIC mode to the block of video data, video encoder 200 and video decoder 300 are configured to determine that a bi-predicted merge candidate in the merge candidate list meets conditions for applying the DMVR mode and has an LIC flag set to true, create a duplicate candidate, in the merge candidate list, of the bi-predicted merge candidate that has the LIC flag set to false, and determine to apply only the LIC mode to the block of video data based on the bi-predicted merge candidate being used, or determining to apply only the DMVR mode to the block of video data based on the duplicate candidate of the bi-predicted merge candidate being used.

In another example, to determine to apply only one of the DMVR mode or the LIC mode to the block of video data, video encoder 200 and video decoder 300 are configured to determine a bi-predicted merge candidate in the merge candidate list meets conditions for applying the DMVR mode and has an LIC flag set to true, and determine to apply only the LIC mode to the block of video data based on the bi-predicted merge candidate being used.

In another example, to determine to apply only one of the DMVR mode or the LIC mode to the block of video data, video encoder 200 and video decoder 300 are configured to determine a bi-predicted merge candidate meets conditions for applying the DMVR mode and has an LIC flag set to true, refrain from adding the bi-predicted merge candidate to the merge candidate list, and determine to apply only the LIC mode to the block of video data based on a selected merge candidate from the merge candidate list being used.

The following numbered clauses illustrate one or more aspects of the devices and techniques described in this disclosure.

Aspect 1A—A method of coding video data, the method comprising: coding a block of video data using a merge candidate list that includes one or more bi-predicted merge candidates; determining to apply only one of a decoder side motion vector refinement (DMVR) mode or a local illumination compensation (LIC) mode to the block of video data; and applying one of the DMVR mode or the LIC mode to the block of video data based on the determining.

Aspect 2A—The method of Aspect 1A, wherein determining to apply only one of the DMVR mode or the LIC mode to the block of video data comprises: determining that a bi-predicted merge candidate in the merge candidate list meets conditions for applying the DMVR mode and has an LIC flag set to true; setting the LIC flag to false; and determining to apply DMVR mode based on the bi-predicted merge candidate being used.

Aspect 3A—The method of Aspect 1A, wherein determining to apply only one of the DMVR mode or the LIC mode to the block of video data comprises: determining that a bi-predicted merge candidate in the merge candidate list meets conditions for applying the DMVR mode and has an LIC flag set to true; creating a duplicate of the bi-predicted merge candidate that has the LIC flag set to false; determining to apply only the LIC mode to the block of video data based on the bi-predicted merge candidate being used; and determining to apply only the DMVR mode to the block of video data based on duplicate of the bi-predicted merge candidate being used.

Aspect 4A—The method of Aspect 1A, wherein determining to apply only one of the DMVR mode or the LIC mode to the block of video data comprises: determining a bi-predicted merge candidate in the merge candidate list meets conditions for applying the DMVR mode and has an LIC flag set to true; and determining to apply only the LIC mode to the block of video data based on the bi-predicted merge candidate being used.

Aspect 5A—The method of Aspect 1A, wherein determining to apply only one of the DMVR mode or the LIC mode to the block of video data comprises: determining a bi-predicted merge candidate meets conditions for applying the DMVR mode and has an LIC flag set to true; refraining from adding the bi-predicted merge candidate to the merge candidate list; and determining to apply only the LIC mode to the block of video data based on the a selected merge candidate from the merge candidate list.

Aspect 6A—The method of any of Aspects 1A-5A, wherein the DMVR mode is one of a regular DMVR mode, an affine DMVR mode, an adaptive DMVR mode, or an adaptive affine DMVR mode.

Aspect 7A—A method of coding video data, the method comprising: determining that a block of video data may be coded using both decoder side motion vector refinement (DMVR) mode and a local illumination compensation (LIC) mode; inheriting parameters for the LIC mode from a previously-coded block; and coding the block of video data using both DMVR mode and LIC mode.

Aspect 8A—The method of any of Aspects 1A-7A, wherein coding comprises decoding.

Aspect 9A—The method of any of Aspects 1A-7A, wherein coding comprises encoding.

Aspect 10A—A device for coding video data, the device comprising one or more means for performing the method of any of Aspects 1A-9A.

Aspect 11A—The device of Aspect 10A, wherein the one or more means comprise one or more processors implemented in circuitry.

Aspect 12A—The device of any of Aspects 10A and 11A, further comprising a memory to store the video data.

Aspect 13A—The device of any of Aspects 10A-12A, further comprising a display configured to display decoded video data.

Aspect 14A—The device of any of Aspects 10A-13A, wherein the device comprises one or more of a camera, a computer, a mobile device, a broadcast receiver device, or a set-top box.

Aspect 15A—The device of any of Aspects 10A-14A, wherein the device comprises a video decoder.

Aspect 16A—The device of any of Aspects 10A-15A, wherein the device comprises a video encoder.

Aspect 17A—A computer-readable storage medium having stored thereon instructions that, when executed, cause one or more processors to perform the method of any of Aspects 1A-9A.

Aspect 1B—A method of coding video data, the method comprising: coding a block of video data using a merge candidate list that includes one or more bi-predicted merge candidates; determining to apply only one of a decoder side motion vector refinement (DMVR) mode or a local illumination compensation (LIC) mode to the block of video data; and applying one of the DMVR mode or the LIC mode to the block of video data based on the determination.

Aspect 2B—The method of Aspect 1B, wherein determining to apply only one of the DMVR mode or the LIC mode to the block of video data comprises: determining that a bi-predicted merge candidate in the merge candidate list meets conditions for applying the DMVR mode and has an LIC flag set to true; setting the LIC flag to false; and determining to apply DMVR mode based on the bi-predicted merge candidate being used.

Aspect 3B—The method of Aspect 1B, wherein determining to apply only one of the DMVR mode or the LIC mode to the block of video data comprises: determining that a bi-predicted merge candidate in the merge candidate list meets conditions for applying the DMVR mode and has an LIC flag set to true; creating a duplicate candidate, in the merge candidate list, of the bi-predicted merge candidate that has the LIC flag set to false; and determining to apply only the LIC mode to the block of video data based on the bi-predicted merge candidate being used, or determining to apply only the DMVR mode to the block of video data based on the duplicate candidate of the bi-predicted merge candidate being used.

Aspect 4B—The method of Aspect 1B, wherein determining to apply only one of the DMVR mode or the LIC mode to the block of video data comprises: determining a bi-predicted merge candidate in the merge candidate list meets conditions for applying the DMVR mode and has an LIC flag set to true; and determining to apply only the LIC mode to the block of video data based on the bi-predicted merge candidate being used.

Aspect 5B—The method of Aspect 1B, wherein determining to apply only one of the DMVR mode or the LIC mode to the block of video data comprises: determining a bi-predicted merge candidate meets conditions for applying the DMVR mode and has an LIC flag set to true; refraining from adding the bi-predicted merge candidate to the merge candidate list; and determining to apply only the LIC mode to the block of video data based on a selected merge candidate from the merge candidate list being used.

Aspect 6B—The method of any of Aspect 1B-5B, wherein the DMVR mode is one of a regular DMVR mode, an affine DMVR mode, an adaptive DMVR mode, or an adaptive affine DMVR mode.

Aspect 7B—The method of any of Aspect 1B-6B, wherein the merge candidate list is a regular merge candidate list or an affine merge candidate list.

Aspect 8B—The method of any of Aspect 1B-7B, wherein coding the block of video data comprises encoding the block of video data.

Aspect 9B—The method of any of Aspect 1B-7B, wherein coding the block of video data comprises decoding the block of video data.

Aspect 10B—An apparatus configured to code video data, the apparatus comprising: a memory; and processing circuitry in communication with the memory, the processing circuitry configured to: code a block of video data using a merge candidate list that includes one or more bi-predicted merge candidates; determine to apply only one of a decoder side motion vector refinement (DMVR) mode or a local illumination compensation (LIC) mode to the block of video data; and apply one of the DMVR mode or the LIC mode to the block of video data based on the determination.

Aspect 11B—The apparatus of Aspect 10B, wherein to determine to apply only one of the DMVR mode or the LIC mode to the block of video data, the processing circuitry is further configured to: determine that a bi-predicted merge candidate in the merge candidate list meets conditions for applying the DMVR mode and has an LIC flag set to true; set the LIC flag to false; and determine to apply DMVR mode based on the bi-predicted merge candidate being used.

Aspect 12B—The apparatus of Aspect 10B, wherein to determine to apply only one of the DMVR mode or the LIC mode to the block of video data, the processing circuitry is further configured to: determine that a bi-predicted merge candidate in the merge candidate list meets conditions for applying the DMVR mode and has an LIC flag set to true; create a duplicate candidate, in the merge candidate list, of the bi-predicted merge candidate that has the LIC flag set to false; and determine to apply only the LIC mode to the block of video data based on the bi-predicted merge candidate being used, or determining to apply only the DMVR mode to the block of video data based on the duplicate candidate of the bi-predicted merge candidate being used.

Aspect 13B—The apparatus of Aspect 10B, wherein to determine to apply only one of the DMVR mode or the LIC mode to the block of video data, the processing circuitry is further configured to: determine a bi-predicted merge candidate in the merge candidate list meets conditions for applying the DMVR mode and has an LIC flag set to true;

and determine to apply only the LIC mode to the block of video data based on the bi-predicted merge candidate being used.

Aspect 14B—The apparatus of Aspect 10B, wherein to determine to apply only one of the DMVR mode or the LIC mode to the block of video data, the processing circuitry is further configured to: determine a bi-predicted merge candidate meets conditions for applying the DMVR mode and has an LIC flag set to true; refrain from adding the bi-predicted merge candidate to the merge candidate list; and determine to apply only the LIC mode to the block of video data based on a selected merge candidate from the merge candidate list being used.

Aspect 15B—The apparatus of any of Aspect 10B-14B, wherein the DMVR mode is one of a regular DMVR mode, an affine DMVR mode, an adaptive DMVR mode, or an adaptive affine DMVR mode.

Aspect 16B—The apparatus of any of Aspect 10B-15B, wherein the merge candidate list is a regular merge candidate list or an affine merge candidate list.

Aspect 17B—The apparatus of any of Aspect 10B-16B, wherein to code the block of video data, the processing circuitry is configured to encode the block of video data.

Aspect 18B—The apparatus of any of Aspect 10B-16B, wherein to code the block of video data, the processing circuitry is configured to decode the block of video data.

Aspect 19B—A non-transitory computer-readable storage medium storing instructions that, when executed, cause one or more processors of a device configured to code video data to: code a block of video data using a merge candidate list that includes one or more bi-predicted merge candidates; determine to apply only one of a decoder side motion vector refinement (DMVR) mode or a local illumination compensation (LIC) mode to the block of video data; and apply one of the DMVR mode or the LIC mode to the block of video data based on the determination.

Aspect 20B—The non-transitory computer-readable storage medium of Aspect 19B, wherein the DMVR mode is one of a regular DMVR mode, an affine DMVR mode, an adaptive DMVR mode, or an adaptive affine DMVR mode.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media may include one or more of RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:
1. A method of coding video data, the method comprising:
coding a block of video data using a merge candidate list that includes one or more bi-predicted merge candidates;
determining to apply only one of a decoder side motion vector refinement (DMVR) mode or a local illumination compensation (LIC) mode to the block of video data comprising:
determining that a bi-predicted merge candidate in the merge candidate list meets conditions for applying the DMVR mode and has an LIC flag set to true;

creating a duplicate candidate, in the merge candidate list, of the bi-predicted merge candidate that has the LIC flag set to false; and determining to apply only the LIC mode to the block of video data based on the bi-predicted merge candidate being used, or to apply only the DMVR mode to the block of video data based on the duplicate candidate of the bi-predicted merge candidate being used; and applying one of the DMVR mode or the LIC mode to the block of video data based on the determination.

2. The method of claim 1, wherein determining to apply only one of the DMVR mode or the LIC mode to the block of video data comprises:

determining that a bi-predicted merge candidate in the merge candidate list meets conditions for applying the DMVR mode and has an LIC flag set to true;

setting the LIC flag to false; and determining to apply DMVR mode based on the bi-predicted merge candidate being used.

3. The method of claim 1, wherein determining to apply only one of the DMVR mode or the LIC mode to the block of video data comprises:

determining a bi-predicted merge candidate in the merge candidate list meets conditions for applying the DMVR mode and has an LIC flag set to true; and determining to apply only the LIC mode to the block of video data based on the bi-predicted merge candidate being used.

4. The method of claim 1, wherein determining to apply only one of the DMVR mode or the LIC mode to the block of video data comprises:

determining a bi-predicted merge candidate meets conditions for applying the DMVR mode and has an LIC flag set to true;

refraining from adding the bi-predicted merge candidate to the merge candidate list; and determining to apply only the LIC mode to the block of video data based on a selected merge candidate from the merge candidate list being used.

5. The method of claim 1, wherein the DMVR mode is one of a regular DMVR mode, an affine DMVR mode, an adaptive DMVR mode, or an adaptive affine DMVR mode.

6. The method of claim 1, wherein the merge candidate list is a regular merge candidate list or an affine merge candidate list.

7. The method of claim 1, wherein coding the block of video data comprises encoding the block of video data.

8. The method of claim 1, wherein coding the block of video data comprises decoding the block of video data.

9. An apparatus configured to code video data, the apparatus comprising:

a memory; and processing circuitry in communication with the memory, the processing circuitry configured to:

code a block of video data using a merge candidate list that includes one or more bi-predicted merge candidates;

determine to apply only one of a decoder side motion vector refinement (DMVR) mode or a local illumination compensation (LIC) mode to the block of video data, wherein to determine to apply only one of the DMVR mode or the LIC mode to the block of video data, the processing circuitry is further configured to:

determine that a bi-predicted merge candidate in the merge candidate list meets conditions for applying the DMVR mode and has an LIC flag set to true;

create a duplicate candidate, in the merge candidate list, of the bi-predicted merge candidate that has the LIC flag set to false; and determine to apply only the LIC mode to the block of video data based on the bi-predicted merge candidate being used, or determining to apply only the DMVR mode to the block of video data based on the duplicate candidate of the bi-predicted merge candidate being used; and apply one of the DMVR mode or the LIC mode to the block of video data based on the determination.

10. The apparatus of claim 9, wherein to determine to apply only one of the DMVR mode or the LIC mode to the block of video data, the processing circuitry is further configured to:

determine that a bi-predicted merge candidate in the merge candidate list meets conditions for applying the DMVR mode and has an LIC flag set to true;

set the LIC flag to false; and determine to apply DMVR mode based on the bi-predicted merge candidate being used.

11. The apparatus of claim 9, wherein to determine to apply only one of the DMVR mode or the LIC mode to the block of video data, the processing circuitry is further configured to:

determine a bi-predicted merge candidate in the merge candidate list meets conditions for applying the DMVR mode and has an LIC flag set to true; and determine to apply only the LIC mode to the block of video data based on the bi-predicted merge candidate being used.

12. The apparatus of claim 9, wherein to determine to apply only one of the DMVR mode or the LIC mode to the block of video data, the processing circuitry is further configured to:

determine a bi-predicted merge candidate meets conditions for applying the DMVR mode and has an LIC flag set to true;

refrain from adding the bi-predicted merge candidate to the merge candidate list; and determine to apply only the LIC mode to the block of video data based on a selected merge candidate from the merge candidate list being used.

13. The apparatus of claim 9, wherein the DMVR mode is one of a regular DMVR mode, an affine DMVR mode, an adaptive DMVR mode, or an adaptive affine DMVR mode.

14. The apparatus of claim 9, wherein the merge candidate list is a regular merge candidate list or an affine merge candidate list.

15. The apparatus of claim 9, wherein to code the block of video data, the processing circuitry is configured to encode the block of video data.

16. The apparatus of claim 9, wherein to code the block of video data, the processing circuitry is configured to decode the block of video data.

17. A non-transitory computer-readable storage medium storing instructions that, when executed, cause one or more processors of a device configured to code video data to:

code a block of video data using a merge candidate list that includes one or more bi-predicted merge candidates;

determine to apply only one of a decoder side motion vector refinement (DMVR) mode or a local illumination compensation (LIC) mode to the block of video data, wherein to determine to apply only one of the DMVR mode or the LIC mode to the block of video data, the instructions further cause the one or more processors to:
- determine that a bi-predicted merge candidate in the merge candidate list meets conditions for applying the DMVR mode and has an LIC flag set to true;
- create a duplicate candidate, in the merge candidate list, of the bi-predicted merge candidate that has the LIC flag set to false; and
- determine to apply only the LIC mode to the block of video data based on the bi-predicted merge candidate being used, or determining to apply only the DMVR mode to the block of video data based on the duplicate candidate of the bi-predicted merge candidate being used; and apply one of the DMVR mode or the LIC mode to the block of video data based on the determination.

18. The non-transitory computer-readable storage medium of claim 17, wherein the DMVR mode is one of a regular DMVR mode, an affine DMVR mode, an adaptive DMVR mode, or an adaptive affine DMVR mode.

\* \* \* \* \*